United States Patent [19]

Kawamura et al.

[11] Patent Number: 4,475,221
[45] Date of Patent: Oct. 2, 1984

[54] COPYING MACHINE MANAGING APPARATUS

[75] Inventors: Michio Kawamura, Anjo; Takeshi Kato, Funabashi; Yoshikazu Yoshizawa, Ebina, all of Japan

[73] Assignees: Nippondenso Co., Ltd., Kariya; Systemkiki Co., Ltd.; Fuji Xerox Co., Ltd., both of Tokyo, all of Japan

[21] Appl. No.: 265,690

[22] Filed: May 20, 1981

[30] Foreign Application Priority Data

May 22, 1980 [JP] Japan .................................. 55-68247

[51] Int. Cl.³ .............................................. G06G 9/04
[52] U.S. Cl. ........................................ 377/13; 377/2; 377/14; 377/26; 364/200
[58] Field of Search ........................ 377/13, 2, 14, 26; 364/200

[56] References Cited

U.S. PATENT DOCUMENTS 4,260,878  4/1981  Kawamura et al. .................. 377/13
4,396,981  8/1983  Terakawa ............................ 364/200

Primary Examiner—Joseph A. Orsino, Jr.
Assistant Examiner—Timothy K. Greer
Attorney, Agent, or Firm—Cushman, Darby & Cushman

[57] ABSTRACT

A copying machine managing apparatus identifies information recorded on a plurality of using section magnetic cards and on an administrative department magnetic card. The plurality of using section magnetic cards are respectively assigned to using sections and bearing thereon respective using section codes. When one of the using section magnetic card is inserted in a slit of the copying machine managing apparatus, the using section code is identified and a copying machine associated therewith is made operable. The number copies produced by the particular using section is accumulated by a digital computer at each production of a copy and stored in an RAM. The accumulated number is at the same time indicated on an indicator window of the managing apparatus. When the administrative department magnetic card is inserted in the slit, the accumulated number of copies for each using section is successively read out from the RAM and indicated on the indicator window. The successive read out and indication of the accumulated number of each using section is continued as long as the administrative department magnetic card is kept inserted in the slit of the managing apparatus.

3 Claims, 4 Drawing Figures

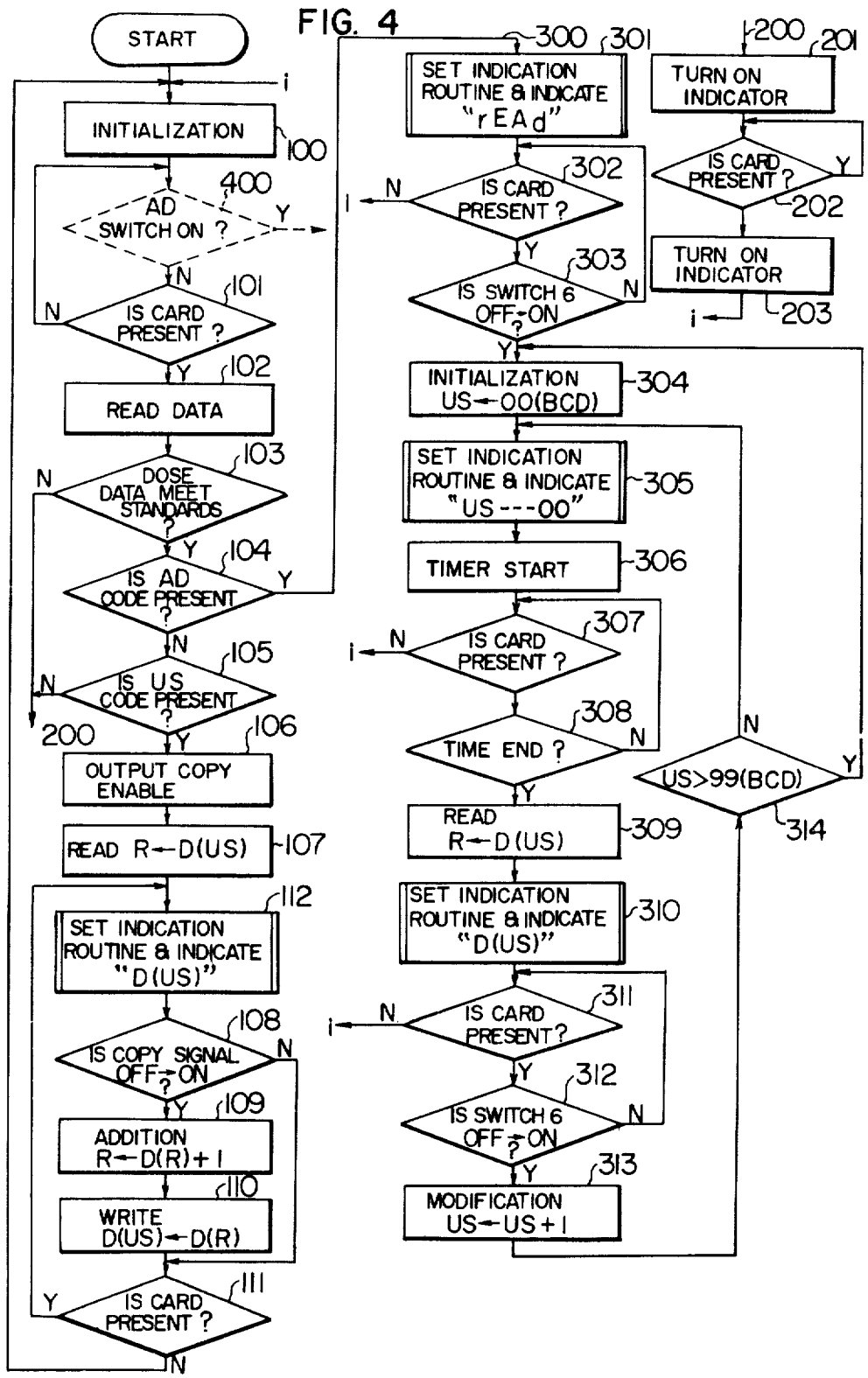

4,475,221

COPYING MACHINE MANAGING APPARATUS

BACKGROUND OF THE INVENTION

This invention relates to improvements in copying machine managing apparatus so designed that where a particular copying machine is used by a plurality of using sections or departments (or users), the value of copies produced by each of the using sections is managed collectively.

Adapted for use with copying machines of the type which is used for producing copies of documents or the like, apparatuses are known in the art which are designed to separately manage mainly the cumulative values of the numbers of copies produced by the respective using sections for the purpose of determining the shares of expenses which are to be borne by the respective using sections. One of these known apparatuses is disclosed in U.S. patent application Ser. No. 4478, now U.S. Pat. No. 4,260,878, in which a code indicative of each using section is recorded on a portable information recording medium issued to the using section and the apparatus formed as an integral part of the copying machine reads the code on each of the recording mediums and cumulatively stores the value of copies (e.g., the number of copies) collectively in the storage locations allocated to each of the using sections.

This type of known apparatus is advantageous in that the copying machine usage values of the respective using sections can be stored collectively, that each of the using sections is simply required to hold an information recording medium and perform the operation required for the medium reading operation when using the copying machine thus requiring no mental effort to memorize the code of the using section and that the cumulative storage can be performed positively. However, the known apparatus presents an operational problem when reading the usage value of each of the using section from the associated locations of the memory. In other words, in order to obtain the total usage values of the respective using sections, it is necessary for the administrative department (or the administrator) to collect the information recording mediums from the using sections or alternatively information recording mediums having recorded thereon the same codes as the using sections are preliminarily prepared for sequential reading by the administrative apparatus such that each time the copying machine is used by any using section the stored value corresponding to the using department is indicated on the indicator of the managing apparatus, thus requiring the preliminary preparation of a large number of information recording mediums and requiring much labor for subjecting the recording mediums to sequential reading operation.

With a view to overcoming the foregoing deficiencies in the prior art, it is an object of the present invention to provide an improved copying machine managing apparatus so designed that the operation of producing the total usage value of each of the using sections is simplified extremely.

To accomplish the above object, the present invention provides a managing apparatus designed so that in response to a predetermined operation performed externally on the managing apparatus by each of the using sections, the managing apparatus successively reads out the usage values of the respective using sections which are stored cumulatively in the associated locations of data storage means.

It is another object of the present invention to provide such copying machine managing apparatus which is improved further in that in addition to the using sections, the administrative department is provided with an exclusive information recording medium having a specified code such that by simply presenting this recording medium for reading, it is possible to read the usage values of the respective using sections, thus allowing only the administrative department to perform a totalization operation through a simple operation.

BRIEF DESCRIPTION OF THE DRAWINGS

The above and other objects, features and advantages of the invention will become readily apparent from the following description taken in conjunction with the accompanying drawings showing an embodiment of a managing apparatus according to this invention, in which:

FIG. 4 is a flow chart for explaining the operation of the digital computer (microcomputer) shown in FIG. 2.

DETAILED DESCRIPTION OF THE PREFERRED EMBODIMENT

The present invention will now be described in greater detail with reference to the illustrated embodiment.

Figure 1:
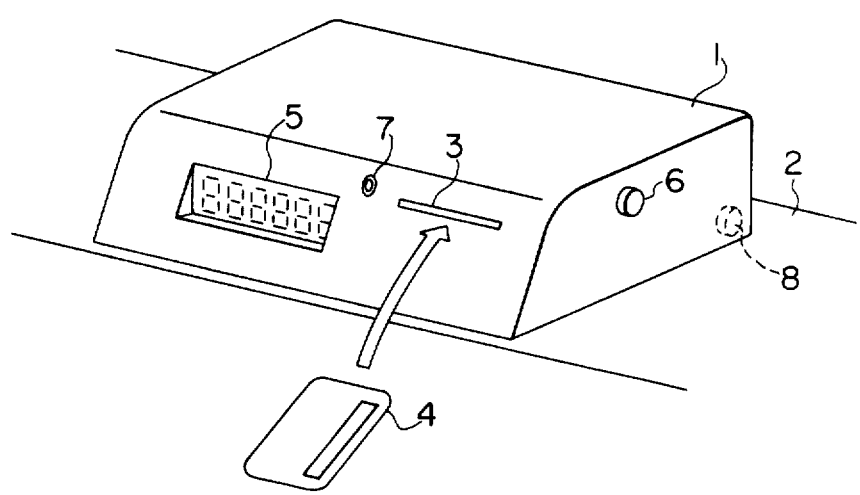
FIG. 1 is a perspective view of the managing apparatus according to the invention.

FIG. 1 shows the external appearance of a managing apparatus 1 which is porvided separately from a copying machine 2. The managing apparatus 1 is light in weight and a double-sided adhesive tape is used to fixedly hold the managing apparatus 1 on the upper surface of the machine 2 at a position where the apparatus 1 does not impede the operation of a person using the copying machine. Numeral 3 designates a slit into which an information recording medium or magnetic card 4 is inserted to enable the copying operation and so on. Arranged in an indicating window 5 are six 7-segment fluorescent display elements to as to indicate a 6-place decimal number. Disposed near the indicating window 5 is an indicator 7 for indicating an erroneous reading of the magnetic card 4. A pushbutton switch 6 is disposed at a side position where it does not impede the operation of the copying machine user when inserting the magnetic card 4. The managing apparatus 1 has its power supply lines and some signal lines connected to the copying machine 2, although they are not shown. Although not shown in particular, the managing apparatus 1 may be incorporated in the copying machine 2 as its integral part.

A magnetic card indicative of the classification of a using section is inserted via the slit 3 and the information is read by the magnetic head disposed inside the apparatus. If the managing apparatus 1 determines that the information conforms with the predetermined standards, the managing apparatus 1 delivers to the copying machine 2 a signal which allows the production of copies. Also the managing apparatus 1 counts pulse signals which are generated by the copying machine 2 one for each copying operation, thus storing the accumulated value corresponding to the using section. When the magnetic card is withdrawn from the slit 3, the operation is stopped. On the other hand, if the information read from the magnetic card 4 does not conform with the standards, the indicator 7 is turned on and a warning is given, thus inhibiting the copying operation.

On the other hand, if a magnetic card 4 indicative of the classification of the administrative department is inserted from the slit 3 and if it is determined that the information read by the magnetic head conforms with the standards, the total number of copies corresponding to the first using section and stored in the first storage locations is indicated by a decimal number at the indicating window 5 of the managing apparatus 1. Then, in response to successive pressing of the pushbutton switch 6, the accumulated numbers of copies made by the second using section and the rest are successively indicated at the indicating window 5. The operation is stopped when the card is removed from the slit 3.

Figure 2:
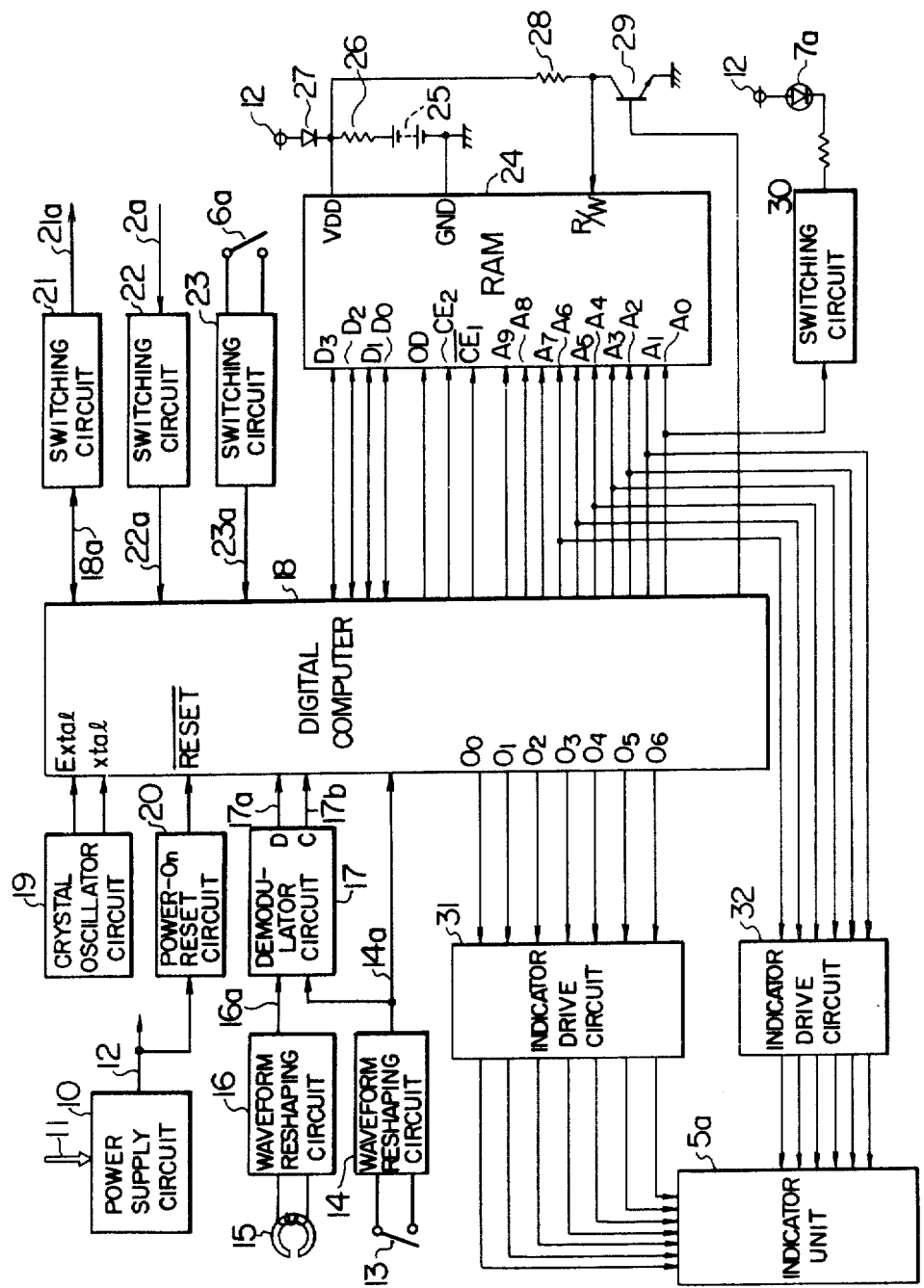
FIG. 2 is a circuit diagram of the apparatus.

FIG. 2 is a circuit diagram of the managing apparatus 1. Numeral 10 designates a power supply circuit for converting the AC supply voltage 11 from the copying machine to a fixed stable DC vaoltage 12 which in turn is supplied to the various logical blocks which will be described later.

A card sensing switch 13 comprises a limit switch so that when a magnetic card 4 is inserted via the slit 3 of FIG. 1, the switch is closed in response to the activation force of the card and the switch is opened when the card is withdrawn. The limit switch may be replaced with a photoelectric switch employing a photo coupler. A waveform reshaping circuit 14 having a small time constant for signal delaying purposes is connected to the sensing switch 13 so that the chattering noise produced at the instant of opening or closing of the sensing switch 13 is removed and a detection signal 14a indicative of the presence or absence of a card is produced accurately.

A magnetic head 15 is positioned inside the slit 3 so that when a magnetic card 4 is inserted from the slit 3, the magnetic information recorded in digital form on the card is converted to an electric signal. This electric signal is applied to a waveform reshaping circuit 16 so that the signal is amplified and reshaped into a rectangular signal 16a. A demodulator circuit 17 extracts the binary coded data represented by the rectangular signal 16a and then the data is applied to a digital computer 18. In this embodiment, the known F-2F system is used as the magnetic card recording system so that in response to the positive-going transition of the card detection signal 14a, the demodulator circuit 17 performs the demodulation in accordance with the F-2F system so that the data 17a in the form of a serial binary signal consisting of a series of logical levels of either "1" or "0" and the clock pulses 17b each corresponding to one of the bits of the data 17a are respectively generated at the output terminals D and C. The F-2F system is designed so that the information is recorded in a single channel and the demodulation is performed by the self-clocking action of the demodulator circuit. The F-2F system demodulator circuit is disclosed in detail in U.S. Pat. No. 3,949,313 for example.

Figure 3:
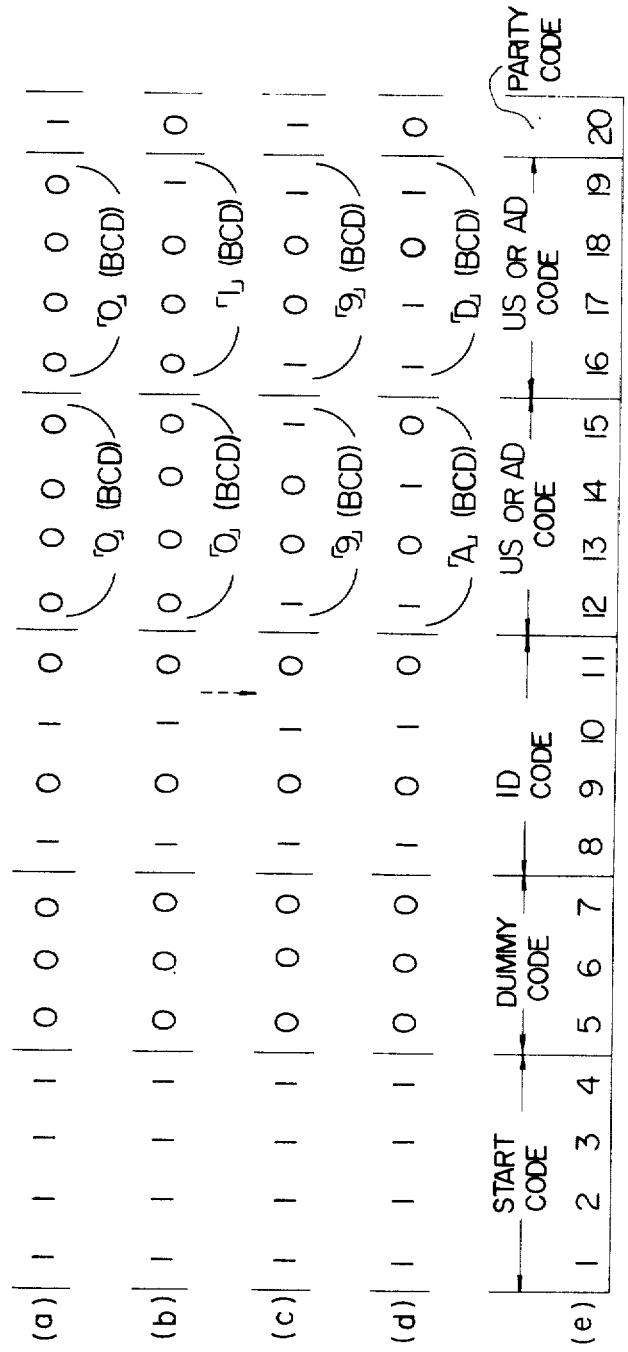
FIG. 3 is a diagram for explaining the arrangement of the data recorded on the information racording mediums.

FIG. 3 shows some exemplary forms of the data 17a represented by the information recorded on the magnetic cards 4. In the Figure, (a), (b) and (c) show three examples of data given to the magnetic cards issued to the using sections, and (d) shows an examplary form of the data given to the magnetic card issued to the administrative department. The series of numerals shown in (e) are provided to indicate the bit numbers of the data for purposes of discussion. The data (a), (b), (c) and (d) classified in correspondence with the using sections and the administrative department, respectively, each consists of 20 bits in which the start code represented by the four bits 1, 2, 3 and 4, the dummy code (nonsignificant code) represented by the three bits 5, 6 and 7 and the ID code (Identification) represented by the four bits 8, 9, 10 and 11 are each set to the same value for all the cards.

The eight bits 12 to 19 are set to represent the classification of the using section or the classification of the administrative department. For purposes of simplification, the classification indicative 8-bit code is in the form of a so-called binary coded decimal or BCD code. More specifically, the data 00000000 represented by the bits 12 to 19 in (a) of FIG. 3 indicates the decimal number 00. In the like manner, the data in (b) of FIG. 3 indicates the decimal number 01, and (c) of FIG. 3 indicates the decimal number 99. In the case of this embodiment, the using sections are divided into 100 sections 00 to 99. The 8-bit codes indicative of the 100 using sections are designated as US codes. On the other hand, the administrative department indicative data shown in (d) of FIG. 3 exceptionally indicates a hexadecimal code AD (hereinafter referred to as an AD code) by means of the data 10101101 represented by the bits 12 to 19. Of course, the bits 12 to 19 may be set to a data indicative of a value other than the AD.

The last one bit or the 20th bit is used as a parity bit which is preset to "1" or "0" such that the sum of all the data of the 20 bits becomes an odd number.

The digital computer 18 shown in FIG. 2 is connected to all the logical circuit blocks and practically all the logical circuit blocks are directly connected to the digital computer 18 to receive or apply signals to the digital computer 18. While the computer 18 may be composed of a digital hardware logic circuitry as disclosed in the previously mentioned U.S. patent application Ser. No. 4478, in this embodiment the computer 18 comprises a microcomputer including, in the form of an LSI chip, a random-access memory (RAM), a readonly memory (ROM) serving as a program memory, a central processing unit (CPU), a timing generator and an input/output port (I/O port) and adapted to repeatedly perform digital computational operations in a time-shared manner in accordance with a predetermined control program on the basis of the stored program system. A good example of such a microcomputer is the type MB8841 of the Fujitsu Co., Ltd. of Japan. Added to the microcomputer 18 are a crystal oscillator circuit 19 for generating reference clock pulses required for effecting the digital computational operations in accordance with the control program and a power-on reset circuit 20 which generates, in synchronism with the start of the DC voltage supply from the power supply circuit 10, a reset signal for excecuting the digital computational operation starting at the starting address of the control program.

A switching circuit 21 amplifies the switching signal 18a generated at a predetermined output terminal of the microcomputer 18 and applies the amplified output signal to a copying machine key switch circuit (not shown) as a command signal 21a for making the copying machine 2 operable. A switching circuit 22 receives the "1" level copy pulse 2a generated for every copying operation from the copy pulse generating circuit (not shown) incorporated in the copying machine 2 and applies it as a switch signal 22a to a predetermined input terminal of the microcomputer 18. Numeral 6a designates the previously mentioned pushbutton switch 6 connected to a waveform reshaping circuit 23 having a small time constant for noise suppressing purposes, and a switch signal 23a which goes to the "0" or "1" level in response to the turning on or off of the switch 6a, is applied to the associated input terminal of the microcomputer 18.

A random access memory or RAM 24 which is separate from the one integrated in the digital computer 8 is connected as data storage means to the microcomputer 18. The RAM 24 includes 4-bit data input/output terminals $D_0$ to $D_3$ and 10-bit address terminals $A_0$ to $A_9$ for addressing the plurality ($2^{10}$) of internal storage locations. The RAM 24 also includes start and stop selection signal input terminals or chip enable terminals $CE_2$ and $\overline{CE}_1$, a write/read selection signal input terminal OD and a write timing signal input terminal R/W. These terminals are connected to the associated input or output terminals of the microcomputer 18 which in turn controls the writing and reading of the data indicative of the number of copies produced.

More specifically, when the signal applied from the computer to the input terminal $CE_2$ goes to the "1" level and the signal applied from the computer to the input terminal $\overline{CE}_1$ goes to the "0" level, the write or read operation of the RAM 24 is enabled. When the signal applied from the computer to the input terminal OD goes to the "1" level, the RAM 24 is operated in the write mode. In this condition, if an address data is applied from the computer to the address terminals $A_0$ to $A_9$, a 4-bit data to be stored is applied to the data input/output termianals $D_0$ to $D_3$ and a "0" level timing pulse is applied to the input terminal R/W, the 4-bit data to be stored is instantaneously written or stored in the storage location designated by the 10-bit address data. In the present embodiment, every four of the locations in the RAM 24 are used as a unit area for storing the accumulated data indicative of the number of copies produced by each using section. In other words, the storage locations of 16 bits are assigned to each using section. Thus, one of the four storage locations can be selected by the two bits of the 10-bit address which are applied to the address terminals $A_8$ and $A_9$ and the remaining eight bits can have a fixed data.

On the other hand, when the signal applied from the computer to the input terminal OD goes to the "0" level, the RAM 24 is operated in read mode. In this condition, if an address data is applied from the computer to the address terminals $A_0$ to $A_9$, the data stored in the storage location designated by the address data is applied to the computer via the input terminals $D_0$ to $D_3$. By virtue of the previously mentioned allocation of the storage locations, the computer can apply its address data four times to the RAM 24 so as to read therefrom the total of 16 bits or the data representing the number of copies produced by a given using section.

By employing a single RAM of a greater capacity or by connecting a plurality of RAMs in parallel, it is possible to increase the storage locations and thereby to increase the number of classified using sections or to increase the maximum value of the accumulated number of copies that can be managed by each using section.

A rechargeable battery 25, a resistor 26 and a diode 27 form a power source backup circuit for the RAM 24 so that if the supply of the DC voltage 12 from the power supply circuit 10 is stopped, the battery 25 supplies the necessary power for retaining the stored contents of the RAM 24. On the other hand, a pull-up resistor 28 always applies to the write timing signal input terminal R/W a write inhibit signal (read mode) which is usually at the "1" level and the same occurs during the backup period by the battery 25. The write operation is possible only when a transistor 29 is turned on by the "1" level signal from the computer 18.

A switching circuit 30 amplifies the switch signal applied from the computer 18 to control the operation of a light-emitting diode 7a forming the indicator 7. The switch signal applied to the switching circuit 30 is transmitted by using one of the signal lines through which the address data is applied to the RAM 24 from the computer 18.

Indicator drive circuits 31 and 32 amplify the command signals from the computer 18 and apply them to an indicator unit 5a comprising six light-emitting devices so as to indicate a 6-place decimal number at the indicating window 5. The indicator drive circuit 31 is used to select the operation of the seven segments of the respective indicator elements and the indicator drive circuit 32 is used to select one of the indicator elements. The six light-emitting indicator elements receive separately or in a time-shared manner the signals from the indicator drive circuits 31 and 32 so as to indicate the desired numerical value. In this case, since each of the indicator elements is driven repeatedly at a short period of several milliseconds, the indication appears to the human eyesight as if the indication is at rest. This type of indication system is well known in the art. Of the signal lines through which the address data is applied to the RAM 24 from the computer 18, the six lines are used for the transmission of the signal applied to the indicator drive circuit 32.

By virtue of the digital computational operations performed by the microcomputer 18 in accordance with the control program, the electric circuitry of the managing apparatus shown in FIG. 2, as a whole, functions organically so as to accomplish the previously mentioned management of the accumulated number of copies data of the respective using sections and the successive reading of these data.

FIG. 4 is a flow chart showing the flow of the control program and the computational operations performed by the microcomputer 18 will now be described with refernece to FIG. 4.

The power supply circuit 10 supplies power to the individual units of the apparatus and the reset state of the microcomputer 18 is released by the power-on reset circuit 20 in response to the start of the power supply. When this occurs, the microcomputer 18 reads the operation codes in a predetermined sequence from the internal program memory (ROM) and starts the execution of the digital computational operations including making of decisions, transfer of data and delivery of command signals to the external devices in accordance with the operation codes. In FIG. 4, every step is not stated in terms of such an operation code but it is stated in terms of a significant operation performed by the microcomputer 18 in accordance with a combination of some of the operation codes.

When the reset state of the microcomputer 18 is released, firstly a step 100 resets the internal RAM and registers and make them stand ready for operation. In this case, all the output signals generated from the computer 18 are made practically invalid and no effect is produced on the RAM 24 used exclusively for data storing purposes.

Then, the control is transferred to a step 101 which in turn determines whether a cord 4 has been inserted through the slit 3 depending on whether the level of the detection signal 14a applied from the waveform reshaping circuit 14 is "1" or "0". This decision step is repeated until the card is inserted.

Then, the control is transferred to a data read step 102 so that the data 17a applied in the form of a serial binary coded signal from the demodulator circuit 17 (see (a), (b) and (c) of FIG. 3), is applied to the computer 18 and stored in the internal RAM in synchronism with the clock pulses 17b.

The next decision step 103 performs a parity check on the 20-bit data just stored in the RAM and also performs a check as to whether the ID code represented by the four bits including the 8th to llth bits coincides with the code 1010. If these checks are satisfied or if it is determined that the data conform with the standards, the control is transferred to the next step 104. If the data do not conform with the standards, the jump shown by an arrow 200 is performed. In other words, a step 201 applies the switch signal to the switching circuit 30 thus lighting the light-emitting diode 7a (the indicator 7). In this way, the reading error is indicated externally. This lighting is maintained until the card is removed from the slit 3 or until the detection signal 14a goes to the "0" level (a step 202), so that if the card is removed, a step 203 terminates the indicator drive command to the switching circuit 30. Thus, the indicator 7 is turned off. On the other hand, the digital computation is started again from the initialization step 100.

If the read data are within the standards, a step 104 checks whether the data of the eight bits including the 12th to 19th bits is the code 10101101 or the AD code (the administrative department code). If it is determined that the data is the AD code, the jump indicated by an arrow 300 is performed and the operation of sequentially reading the accumilated number of copies data is performed. If the data is not the AD code, the control is transferred to a decision step 105 which in turn checks whether the data of the eight bits including the 12th to 19th bits corresponds to one of the US codes (the using section codes). The actual operation consists of checking whether the 8-bit data is terms of a binary coded decimal (BCD) code has a value greater than the decimal number 99 (i.e., at least either the higher four bits or the lower four bits are greater than 1001). If the data is not the US code, in the like manner as mentioned previously the step 201 effects the jump and the indicator 7 gives an error indication.

If the eight bits or the 12th to 19th bits of the read data correspond to one of the US codes, the computer 18 transfers the control from the step 105 to a step 106 et seq. to perform the operations for accumulated number of copies data managing purposes. Firstly, the output step 106 causes the computer 18 to apply a "1" level switch signal 18a from its predetermined output terminal to the switching circuit 21. The switching circuit 21 amplifies and applies the switch signal to the key switch circuit (not shown) of the copying machine 2. As a result, the copying machine 2 is enabled to produce copies and it performs the copying operation in accordance with the command from the operating switch which is not shown.

Then, the control is transferred to a step 107 so that the accumulated number of copies data D (US) of the using section corresponding to the read US code is read from the RAM 24 which is used exclusively for data storage purposes. In this case, the 8-bit US code, as such, is applied as the address data or the eight bits $A_0$ to $A_7$ of the RAM 24 to it and the remaining two bits $A_8$ and $A_9$ are used to select the four data. More specifically, with the eight bits of the 10-bit address data $A_0$ to $A_9$ being fixed as the US code, the remaining two bits $A_8$ and $A_9$ are changed to 00, 01, 10 and 11, respectively, thus performing a total of four reading operations, four bits at a time. For example, if the US code indicates the using section 33, the corresponding four address data for the four reading operations become 0011001100, 0011001101, 0011001110 and 0011001111, respectively. In this way, the 16-bit data of the using section is read entirely and stored in the predetermined location group R of the RAM in the computer 18. In the case of the Fujitsu MB8841, each of the storage locations in the RAM has a storage capacity of 4 bits and thus the read 16-bit data is stored in the four storage locations each storing the four bits of the data. The data of the number of copies thus far produced by the using section and stored in the predetermined address group R in the computer 18 is displayed in a decimal form on the indicating window 5 in a step 112 of the display routine.

Then, steps 108, 109, 110 and 111 perform the cumulative counting of the copies produced. Firstly, the step 108 receives the switch signal 22a corresponding to the copying operation and applied from the switching circuit 22 and detects the transition of the signal from the "0" level to the "1" level. The signal 22a goes from the "0" level to the "1" level each time a copy is produced and after the expiration of several tens milliseconds the signal 22a goes from the "1" level back to the "0" level. Thus, in the apparatus of this embodiment every transition of the signal from the "0" level to the "1" level is detected as the production of one copy. If there is no arrival of the switch signal 22a, the decision of the step 108 results in "NO" and a jump is performed to the step 111. The step 111 again checks the detection signal 14a from the waveform reshaping circuit 14 so that if there is the magnetic card, the control is again transferred to the decision step 108 and the step 108 is performed again.

When a copy is produced so that the copying machine 2 generates a copy signal 2a, the switch signal 22a applied from the switching circuit 22 to the computer 18 goes from the "0" level to the "1" level and the decision of the step 108 results in "YES", thus transferring the control to the step 109. The step 109 makes an increment of 1 to the 16-bit accumulated number of copy data D(R) which was stored in the storage location group R of the computer internal RAM from the data storing RAM 24 by the operation of the step 107. Then, the step 110 again writes the thus increased data D(R) into the storage location group R of the computer internal RMA and in the corresponding storage locations of the data storing RAM 24 (the locations corresponding to the US code). The card decision step 111 determines whether the card has been removed and then the operation of the step 108 or the operations of the steps 109 and 110 are performed. As a result, each time a copy is produced, the accumulated data is increased by 1 and stored in the data storing RAM 24. The same applies to any other using section and its accumulated data is stored in the storage locations corresponding to this using section. When the card 4 is removed from the slit 3, the decision of the step 111 results in "NO" and the control is returned to the initialization step 100, thus waiting for the reinsertion of a card. The initialization step 100 invalidates all the signals generated from the computer 18 so that the copy enable indicative switch signal 18a also goes to the "0" level and the copying operation is inhibited.

If the eight bits 12 to 19 of the read data correspond to the AD code, the computer 18 performs the jump from the step 104 as shown by the arrow 300 and the operations of a step 301 et seq. are performed. Firstly, the step 301 indicates the start of sequential data reading at the indicating window 5. In this case, it is desirable to indicate the required letters by utilizing the seven segments of the indicator elements, that is, it is desirable to program the command signals to the indicator drive circuits 31 and 32 such that letters "rEAd" are indicated as shown in the Figure.

In this case, the indication operation is performed by means of the internal interruption processing effected by the timer included in the computer 18. In other words, the step 301 sets the letters to be indicated so that after the timer interruption has been released, the indication program in the form of a subroutine is automatically performed by interrupt handling at a predetermined period (in this embodiment the period is set to about 2 milliseconds). This indication program is predetermined so that the command signals for one indication operation are applied to the indicator drive circuits 31 and 32 in the previously mentioned manner of indication so as to indicate the data to be indicated at the indicating window 5. After the indication operation has been completed, the program which was being performed prior to the interruption is resumed. In this way, the indicator unit 5a adapted to indicate at the indicating window 5 letters as well as decimal numerical values which will be described later, is energized repeatedly at a high speed or a period of about 2 milliseconds and consequently the display appears to the human eyesight as if it is at rest.

Along with the repetitions of the above-described indication operation, the computer 18 sequentially performs the operations of a step 302 et seq. The card decision step 302 determines whether there is a card and then a step 303 for detecting the operation of the pushbutton switch 6 determines whether the pushbutton switch 6 has been closed in response to the level change of the switch signal 23a from the waveform reshaping circuit 23. If the card is withdrawn, the computer 18 immediately returns to the initialization step 100 and stands by. On the other hand, if the pushbutton switch 6 is not operated and left open, the operations of the steps 302 and 303 are repeated. When the pushbutton switch 6 is operated by the user (the administrative department), the switch signal 23a goes from the "0" level to the "1" level so that in response to this level change the computer 18 proceeds from the decision step 303 to the next step 304. If the operation of the pushbutton switch 6 is stopped, the switch signal 23a returns to the "0" level.

Then, by the step 304 the computer 18 determines the first using section for beginning the reading of data from the RAM 24 storing the accumulated data. In the present embodiment, the data storage locations of the first using section are selected as the reading starting locations. The US code assigned to the first using section is 00000000 as shown in (a) of FIG. 3. Then the indication processing step 305 sets the indication data "US" required for indicating the section numbers indicative of the using sections whose accumulated data are to be indicated instead of the indication "rEAd" indicating that the reading is being performed. These indication data "US" are values converted so as to indicate the US codes or the BCD codes in terms of decimal numbers. The indication processing step 305 is designed so that in the like manner as the previously described indication processing step 301, the indication subroutine program is executed in response to a timer interruption and the indicator drive circuits 31 and 32 are operated in accordance with the set indication data. The decimal number 00 indicative of the first using section is first indicated at the indicating window 5. As regards the form of indication, a mark "US ---" may be added to the head of each of the section numbers as shown in the Figure.

This indication operation is continued until the passage of about 1 second which is determined by a timer count start step 306 and a timer end discrimination step 308. Here the term "timer" indicates the operation of determining a time interval in response to the count-up effected at predetermined intervals by the timer counter incorporated in the computer 18. Thus, the start step 306 starts the count-up and the discrimination step 308 determines whether the count value has reached a predetermined value. During the time that the indication operation is being performed, the presence of the card is repeatedly checked and the control is returned to the initialization step 100 as soon as the card is removed.

After the using section number has been indicated for about 1 second, a step 309 reads the accumulated number of copies data D(US) of the using section from the RAM 24. In other words, the 8-bit US code indicative of the classification of the using section, as such, is applied as the address data $A_0$ to $A_7$ to the RAM 24 and also applied additionally is the 2-bit address data which is changed from 00 to 01, 10 and 11, respectively. Thus, for each of the using sections, the 16-bit accumulated number of copies data D(US) is read in four operations, four bits at a time, and the read data is stored in the corresponding storage location group R of the RAM in the computer 18.

Then, the control is transferred to an indication processing step 310 so that the accumulated number of copies data D(US) stored in the storage location group R and represented in the form of a binary code is converted to a decimal number indication data and set so as to be indicated at the indicating window 5. This indication operation indicates the set data in accordance with the indication subroutine program executed by the timer interruption in the like manner as the steps 301 and 305. Thus, the accumulated number of copies data of the first using section is indicated as the decimal number at the indicating window 5. During the time that this indication is being performed, the operations of a step 311 and the following are sequentially performed so that if the card is removed, the decision of the card discrimination step 311 results in "NO" and the control is immediately transferred to the initialization step 100, thus returning the computer 18 to the standby state.

On the other hand, a decision step 312 checks whether the pushbutton switch 6 has been closed, so that in the like manner as the step 303 the operations of the steps 311 and 312 are repeated until the switch signal 23a goes from the "0" to the "1" level in response to the closing of the pushbutton switch 6. During the time interval, the accumulated number of copies data is continuously indicated at the indicating window 5, thus allowing the user (the administrative department) to record the data in the management note.

When a given time elapses and the pushbutton switch 6 is closed, the using section whose accumulated number of copies data is to be read and indicated is changed from the first section to the next section. More specifically, the control is transferred to an address modification step 313 so that the read address indicative US code (the BCD code preset to 00000000 by the step 304) is increased by 1 by the addition in BCD code form. Thus, as shown in (b) of FIG. 3, the US code becomes 00000001 indicating the decimal number 01. A decision step 314 checks whether the data is greater than the value of 10011001 corresponding to the decimal number 99, so that if the data is smaller than the decimal number 99, a jump is performed to the indication processing step 305.

Thus, as indicated by the steps 305 to 310, the operation of indicating the using section number in the form of a decimal numerical value for about 1 second and the operation of reading and indicating the accumulated number of copies data of the section (for any given time) are performed with respect to the second using section.

When the pushbutton switch 6 is pushed again, the US code for determining the read address is increased (the step 313) and the section number and the accumulated number of copies data are similarly indicated with respect to the third using section. In this way, each time the using section number is modified by 1 at a time, the section number and the accumulated number of copies data are indicated. When the process is repeated so that the using section number attains the 100th, that is, when the US code value modified by the step 313 becomes 100000000 corresponding to the decimal number 100 so that it overflows the eight bits, the decision of the step 314 results in "YES" and a jump is performed to the initialization step 304, thus starting again the operations with respect to the first using section.

In this way, when the magnetic card having the AD code recorded thereon is read, the section number and the accumulated number of copies data of the respective using sections are successively indicated at the indicating window 5 while changing the using sections in response to the operations of the pushbutton switch 6.

The present invention is not intended to be limited to the above-described embodiment and other modifications may of course be made to the embodiment as occasions demand without departing from the scope of the invention as defined by the attached claims. The following may be cited as examples of such modifications.

(1) In addition to magnetic recording cards, punched cards, bar code cards having light and shade bar patterns printed thereon or the like may be used as the portable information recording mediums and the known reading equipment corresponding to their information forms may be used.

(2) In addition to giving the accumulated value of copies of each using section in terms of a value indicative of the number of copies corresponding to the number of times a copy is produced as in the case of the above-described embodiment, the value may be given in terms of a monetary value which is to be paid by each using section. If occasion demands, the value may be varies depending on the size of the copy papers used.

(3) While the timing of cumulatively counting the value of copies such as the number of copies may be such that the count is increased by 1 in synchronism with the production of each copy, the number of copies preset by the number of copies setting key incorporated in the copying machine may be read at a time in response to the operation of the copy start key for cumulative addition purposes.

(4) While, in the above embodiment, the indication of the accumulated usage values of the respective using sections is allowed only for the administrative department, it is possible to arrange so that the accumulated usage value of each using section is indicated when its card is read. For example, in the case of the above embodiment this can be realized by adding an indication processing step so that the indication of the data read from the RAM 24 by the step 107 of the control program shown in FIG. 4 is started before the step 108 and by further adding an indication processing step (this and the first-mentioned indication processing step can be programmed in the like manner as the step 310) so that the indication of the data increased by the step 109 is started before the step 110.

(5) While, in the above embodiment, the usage value of each using section is simply stored cumulatively, the use of the copying machine may be inhibited just after the cumulative value has reached a predetermined value (or when the predetermined value is reached). For this purpose, in the case of the above-mentioned embodiment, for example, a decision step for checking whether the accumulated number of copies data has reached a predetermined value may be provided after each of the steps 107 and 109 in FIG. 4 showing the control program.

(6) While, in the above embodiment, in order to sequentially read and indicate the accumulated usage values of the respective using sections, the operation of semi-automatic data reading is performed in which the processing proceeds to the indication of the next using section each time the pushbutton switch 6 is pressed, it is possible to arrange so that the operation of data reading is performed entirely automatically without using the pushbutton switch. In the case of the above embodiment, this can be realized by replacing, for example, the step 312 of the control program shown in FIG. 4 with a timer processing which is similar to that shown by the steps 306 and 308 so as to limit the indication time to several seconds.

(7) It is possible to arrange so that a printer may be connected so as to print out the read data instead of or in addition to indicating the read data at the indicating window 5.

(8) While, in the above embodiment, the information recording medium with the administrative department indicative AD code is read by the read head to read the accumulated number of copies data from the data stroage means in response to the external operations, it is possible to arrange so taht the data are read successively through the operation of a switch without using such an information recording medium. This can be realized by for example mounting a switch 8 (AD switch) on the side or the back side of the managing apparatus 1 of FIG. 1 at a position where the switch is not readily operable by the ordinary users, applying the output of the switch 8 to the computer 18 through a waveform reshaping circuit and modifying a part of the control program shown in FIG. 4. To effect the desired program modification, it is only necessary to replace the step 104 with an AD switch operation discrimination step 400 indicated by the dotted line in the Figure.

It will thus be seen from the foregoing detailed description that the present invention has a great advantage of extremely simplifying the operation of totalizing the accumulated copying machine usage value of each of a plurality of using sections.

What is claimed is:

1. A copying machine managing apparatus comprising:
   a plurality of first information recording mediums each having recorded thereon information including a using section code classified in correspondence with one of a plurality of using sections;
   a second information recording medium having recorded thereon information including an administrative department code indicative of an administrative department, said second information in the same form as in said first information recording mediums;
   read means for reading information recorded on said first and second information recording mediums so as to generate a read signal corresponding to each said using section code or said administrative department code;
   signal output means for generating a signal to enable operation of a copying machine when activated;
   signal receiving means for receiving a valve signal indicative of a value of copying operations performed by said copying machine;
   data storage means having a plurality of storage locations corresponding to said using sections such that data can be read therefrom and written thereinto;
   data output means; and
   control means responsive to said read signal generated from said read means and including means for discriminating whether said read signal is indicative of one of said using section codes or said administrative department code, said control means selectively performing the following steps:
     (a) when said discriminating means discriminates that read signal is indicative of one of said using section codes, said signal output means is activated and a value indicated by said value signal from said signal receiving means is accumulatively stored in predetermined locations of said data storage means allocated in correspondence with said one using section, and
     (b) when said discriminating means discriminates that said read signal is indicative of said administrative department code, each accumulated value of said using sections stored in the corresponding locations of said data storage means are successively read and are successively indicated on said data output means.

2. A copying machine managing apparatus according to claim 1 further comprising:
   a switch for generating proceed signal when actuated by an operator, and
   wherein said control means further includes:
   means responsive to said read signal indicative of said administrative department code for driving said data output means to indicate thereon a predetermined letter indicating that reading out of the accumulated values of said using sections is commenced;
   means for determining a first using section whose accumulated value is to be read out from said data storage means and for driving said data output means to indicate thereon a decimal number corresponding to a using section code of the first using section;
   means for reading out said accumulated value of said first using section from said data storage means using said using section code as an address;
   means for driving said data output means to indicate thereon a decimal number corresponding to the read out accumulated value; and
   means responsive to said proceed signal generated from said switch for incrementing by one of the decimal number corresponding to the using section code of said first using section thereby to obtain an address of a second using section, said address of the second using section being used to read out an accumulated value of said second using sections from said data storage means.

3. A copying maching managing apparatus according to claim 1 further comprisign a switch actuatable by an operator and connected to said control means for controlling a timing of each of said successive readings of said accumulated values from said data storage means and said successive indication on said data output means.

* * * * *